United States Patent [19]
Yamamoto

[11] 3,944,027
[45] Mar. 16, 1976

[54] FAIL-SAFE DISC BRAKE WITH A CLEARANCE-TAKEUP MECHANISM

[75] Inventor: Mayjue A. Yamamoto, San Bernardino, Calif.

[73] Assignee: Daniel G. Durfee, San Bernardino, Calif.

[22] Filed: May 30, 1974

[21] Appl. No.: 474,360

[52] U.S. Cl. ............ 188/71.9; 188/170; 188/196 F; 188/196 P
[51] Int. Cl.² ................ F16D 55/224; F16D 65/56
[58] Field of Search ...... 188/71.9, 72.1, 170, 196 P, 188/196 F, 196 C

[56] References Cited
UNITED STATES PATENTS

| | | | |
|---|---|---|---|
| 3,277,983 | 10/1966 | Jeffries | 188/196 P |
| 3,338,354 | 8/1967 | Jeffries | 188/196 P |
| 3,520,385 | 7/1970 | Huffman et al. | 188/196 F |
| 3,590,964 | 7/1971 | Krause | 188/196 F |
| 3,613,839 | 10/1971 | MacDuff | 188/170 |
| 3,661,230 | 5/1972 | Burnett | 188/71.9 |
| 3,726,367 | 4/1973 | Evans | 188/71.9 |

FOREIGN PATENTS OR APPLICATIONS

| | | | |
|---|---|---|---|
| 1,425,184 | 10/1968 | Germany | 188/196 P |

*Primary Examiner*—Trygve M. Blix
*Assistant Examiner*—Edward R. Kazenske
*Attorney, Agent, or Firm*—Herbert E. Kidder

[57] ABSTRACT

A disc brake comprising: a caliper housing having axially aligned first and second cylinder bores; a first piston slidable within the first bore and bearing against one of the friction pads; a second piston slidable within the second bore and having an internally threaded tubular piston rod projecting into the first bore; a threaded clearance-takeup member screwed into the piston rod and having a head abutting against the bottom of the first piston; springs acting against one side of the second piston in the direction to apply the brakes; a hydraulic fluid connection for applying pressure fluid to the other side of the second piston so as to release the brake and compress the spring; and a torsion spring having one end connected through a housing to the second piston, and its other end connected to a tubular sleeve that is nonrotatably connected to the clearance-takeup member. The torsion spring exerts a torque on the clearance-takeup member, causing the latter to turn in the direction to extend from the piston rod until all clearance between the head and the bottom of the first piston has been taken up. A friction ring encircles the first piston, and a retracting spring acting against one side of the ring causes the latter to retract the first piston a predetermined minimum distance when the second piston is retracted. If any clearance opens up between the head of the clearance-takeup member and the first piston, such clearance is immediately taken up by the torsion spring turning the member in the direction to extend the same.

2 Claims, 5 Drawing Figures

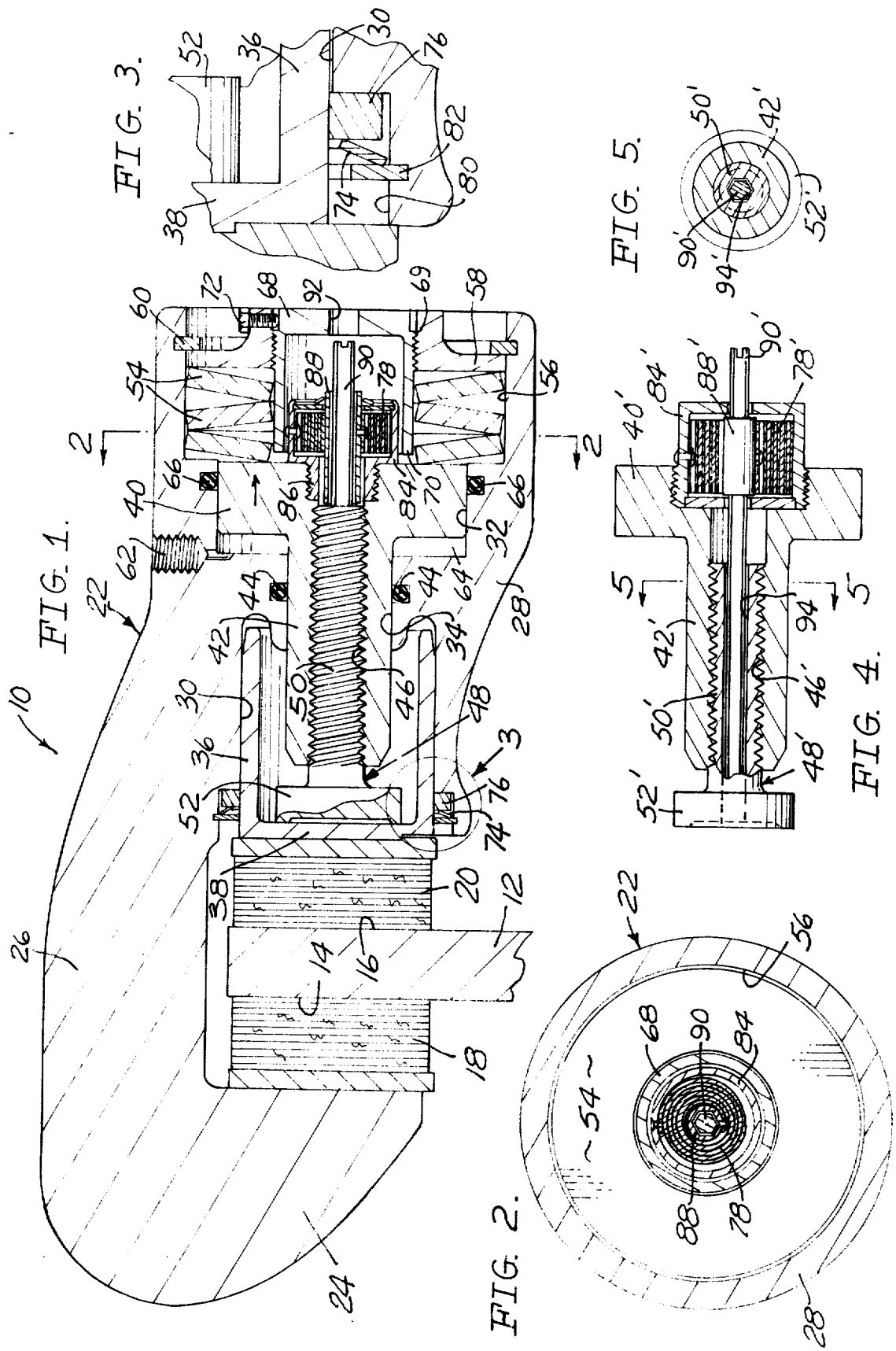

FAIL-SAFE DISC BRAKE WITH A CLEARANCE-TAKEUP MECHANISM

BACKGROUND OF THE INVENTION

The present invention relates to disc brakes of the type in which the brakes are actuated by spring pressure, and are released by application of fluid pressure to one side of an actuating piston. Brakes of this type are widely used on heavy machinery, such as cranes, rolling mill equipment, bridge machinery, elevators, belt conveyors, trams, and the like.

More specifically, the invention pertains to a clearance-takeup device whereby all excessive clearances in the system are automatically and continuously taken up, so that the springs actuating the brake require only a minimum extension before the friction pads are solidly engaged against their respective frictional surfaces on the brake disc. The springs are thus enabled to exert the maximum pressure against the friction pads, regardless of wear on the friction pads, or other conditions that might tend to increase the clearances. With spring-actuated brakes, it is essential that the springs exert a constant spring force against the friction pads at all times, and this requires that the springs act through constant distance of extension between the fully-released and fully-applied conditions.

Spring-actuated disc brakes are known in the art, and various attempts have been made to provide automatic clearance-takeup devices for the same, so as to maintain a more-or-less constant air gap between the friction pads and the disc surfaces. However, none of these clearance-takeup devices has been entirely satisfactory for various reasons. In some cases, the devices have been complicated and expensive to manufacture and service. In other cases, they have been lacking in sensitivity and reliability. Another objectionable characterisitc of some prior devices has been a tendency of the clearance-takeup mechanism to overadjust, with the result that the brake cannot be fully released. As a consequence, the brake drags and wears excessively, and power is wasted driving the machinery against the frictional drag of the brake.

SUMMARY OF THE INVENTION

The primary object of the present invention is to provide a spring-actuated disc brake which includes means for automatically taking up all of the clearances in the system except for a minimal running clearance between the frictional surfaces and the friction pads. Thus, with minimum clearance to be taken up, the springs are enabled to exert full braking pressure on the friction pads.

Another object of the invention is to provide a spring-actuated disc brake, wherein a constant air gap is provided between the friction pads and the frictional surfaces on the disc at all times.

Another object of the invention is to provide a spring-actuated disc brake having a smooth braking action, short actuating time, high braking power, and one that is simple and rugged in construction, with nothing to get out of order.

Other features of the invention are that it is inexpensive to manufacture, and has a sensitive clearance-takeup device that operates automatically to take up even such small clearances as one or two thousandths of an inch.

A further object of the invention is to provide a spring-actuated brake having a fail-safe characteristic. The brakes are applied automatically to stop the machinery if there should be a power failure, and the brakes will hold for as long as is required, without the application of external power.

These and other objects and advantages of the present invention will appear to those skilled in the art from the following detailed description of the preferred embodiment thereof, with reference to the accompanying drawings.

BRIEF DESCRIPTION OF THE DRAWINGS

FIG. 1 is a cross-sectional view of a disc brake made in accordance with the teachings of the present invention;

FIG. 2 is a cross-sectional view through the same, taken at 2—2 in FIG. 1;

FIG. 3 is an enlarged, fragmentary sectional view of the encircled area designated by the numeral 3 in FIG. 1;

FIG. 4 is a sectional view through another embodiment of the clearance-takeup mechanism of the invention; and FIG. 5 is a sectional view taken at 5—5 in FIG. 4.

DESCRIPTION OF THE PREFERRED EMBODIMENT

In the drawings, a disc brake embodying the invention is designated generally by the reference numeral 10, and includes a rotatable disc 12 having a pair of friction surfaces 14 and 16 on opposite sides thereof. A pair of friction pads 18, 20 are disposed adjacent the friction faces 14 and 16, respectively, and are adapted to frictionally engage the latter when the brake is actuated. A caliper frame designated generally by the reference numeral 22 is slidably mounted on a supporting structure in a manner well-known to those skilled in the art, and includes an inwardly extending portion 24 which is disposed adjacent the friction pad 18, a bridge portion 26 which straddles the periphery of the disc 12, and a housing 28 defining two axially aligned cylinder bores 30 and 32, which are connected by a cylindrical aperture 34 extending along the axis of the cylinder bores. Cylinder bore 30 is disposed directly behind friction pad 20, as shown in the drawing.

Slidably disposed within cylinder bore 30 is a first, cup-shaped piston 36, having an end portion 38 bearing against the adjacent friction pad 20. A second piston 40 is slidably disposed within the other cylinder bore 32, and piston 40 has a piston rod 42 passing through the cylindrical aperture 34 into the cylinder bore 30. Piston rod 42 fits snugly within the cylindrical aperture 34 and is sealed against leakage by means of a sealing ring 44, which seals the clearance between the surfaces. Extending lengthwise through the piston rod 42 and piston 40, along the axis thereof, is an internally threaded bore 46.

A clearance-takeup member 48 has a threaded stem 50 that is screwed into the internally threaded bore 46 of the piston rod 42, and member 48 has a head 52 at one end thereof which abuts against the bottom 38 of the first piston 36, so that when piston 40 is urged toward the left to apply the brakes, the clearance-takeup member 48 pushes piston 36 in the same direction, causing the friction pad 20 to be pressed against its friction surface 16. At the same time, the reaction force acting against the caliper 22 causes the other friction pad 18 to be pressed against its friction surface 14.

Engaging the outer end of piston 40 is a compression spring means in the form of a plurality of cupped spring discs 54, which are contained within a cavity 56 in the outer end of the caliper body 28. The outermost spring disc 54 bears against a retainer 58, which is seated against a snap ring 60. Springs 54 press against piston 40 with a considerable spring pressure, urging the piston toward the left to actuate the brakes.

The brake of the present invention is released and held in the released position by means of fluid pressure, and to this end an inlet opening 62 is provided, which is internally threaded to receive a screw-fitting for joining a hydraulic line (not shown) to the caliper body, said line being connected to a source of pressure fluid controlled by the operator. Inlet 62 communicates with the cylinder 64 so that fluid pressure can be introduced into this space and act against the side of piston 40 opposite springs 54. An O-ring seal 66 seals the clearance between the piston 40 and cylinder bore 32. As fluid pressure is applied to the piston, the piston is moved to the right, against the pressure of the springs 54. Springs 54 are compressed and flattened, thereby storing up the spring pressure necessary to actuate the brakes. Movement of the piston 40 to the right under the influence of fluid pressure is limited by a limit stop member 68, which is cup-shaped and has threads 69 that screw into a threaded opening in the closure member 58. The annular skirt of the cup-shaped member 68 has an end surface 70 which is adjustably spaced from the end of piston 40 the exact distance that it is desired to have the piston travel in the process of compressing springs 54. To adjust this distance, the member 68 is screwed in to the correct distance and then locked in place by means of a set screw 72.

Cupped springs 54 have the characteristic of developing powerful spring pressure over a relatively short stroke. It is therefore essential that all necessary clearances in the mechanism be reduced to the absolute minimum, so that the springs will, in a very short distance of extension, take up all of the clearances in the system and clamp the friction pads 18 and 20 against their respective friction surfaces 14 and 16 with full braking pressure. To eliminate all unnecessary clearances, particularly that due to wear of the friction pads 18, 20, an automatic clearance-takeup is provided, which consists of two separate but cooperating devices; the first being a cupped retracting spring 74 and friction ring 76, which retract the piston 36 from friction pad 20 a very short distance (e.g., 0.010 to 0.040 inch) only sufficient to provide clearance between the pads 18, 20 and their respective friction surfaces 14 and 16, when the braking pressure is relieved; and the second being a torsion spring 78 with accessory components to extend the clearance-takeup member 48 with respect to piston 40 so as to take up any clearance that develops between the end of the head 52 and the bottom 38 of piston 36.

As best shown in FIG. 3, retracting spring 74 and friction ring 76 are contained within an annular space 80 formed by counterboring the open end of cylinder bore 30, and spring 74 bears against a split retainer ring 82, which is seated within a circumferential groove. Retainer ring 82 is spaced from the bottom of the counterbore 80 a distance such that the friction ring can only move a very short distance to the left, e.g., 0.010 to 0.040 inch, before retracting spring 74 is fully compressed and lies flat against retainer ring 82. When friction ring 76 is seated against the bottom of the counterbore, as shown in FIG. 3, spring 74 is substantially unstressed, or relaxed, but still is in contact with the ring 76 on one side and ring 82 on the other.

Friction ring 76 is made of material having a good coefficient of friction, and encircles piston 36 near the bottom end thereof in a snug frictional grip. The frictional grip of ring 76 on piston 36 is sufficiently strong that the ring is able to compress and flatten spring 74 against retainer ring 82 when piston 36 is pushed to the left by piston 40 under pressure exerted by springs 54. Once the spring 74 has been fully compressed (that is, flattened against split retainer ring 82), friction ring 76 is stopped against any further movement to the left, and piston 36 can be pushed through the friction ring 76 by piston 40 until the friction pads 18, 20 are fully clamped against the friction faces 14, 16.

When fluid pressure is introduced into the cylinder space 64 to release the brakes, piston 40 is shifted to the right, which removes the pressure of the head 52 from bottom 38 of piston 36, and this allows retracting spring 74 to push the friction ring 76 and piston 36 to the right until ring 76 seats against the bottom of the counterbore, at which point piston 36 is stopped. Piston 36 is thus seen to be a passive piston, being pushed to the left (in FIG. 1) by springs 54 acting against piston 40, and being pushed to the right by retracting spring 74; the only connection between pistons 36 and 40 being the contact of head 52 against the bottom of piston 36. Each time that piston 40 is moved to the right by fluid pressure, it abuts against the end 70 of member 68, and at the same time that piston 40 is moved to the right, piston 36 is moved to the right by retracting spring 74 until spring 74 has reached the limit of its travel, at which point piston 36 stops. If piston 40 should continue moving to the right for an additional few thousandths of an inch, due to wear of the friction pads 18, 20, head 52 would move away from the bottom 38 of piston 36, opening up a clearance between them, This clearance is immediately taken up by the torsion spring 78 and its accessory components in a manner that will now be explained.

Torsion spring 78 is a spiral coil spring, confined within a cup-shaped housing 84 having a threaded shank 86 that is screwed into a tapped counterbore at the end of the threaded bore 46. Housing 84 is also enclosed within cup-shaped member 68, as shown in FIG. 1. Spiral spring 78 has its outer end connected to the wall of the housing 84, and its inner end is connected to a tubular sleeve 88 having a polygonal (preferably hexagonal) bore, through which a similarly shaped (i.e., polygonal or hexagonal) rod 90 passes. Rod is fixed to the end of threaded shank 50 of member 48, and projects outwardly (to the right in FIG. 1), from the shank along the axis thereof. Tubular sleeve 88 fits snugly over rod 90 and is non-rotatable but freely slidable with respect thereto. As it is connected to one end of speing 78, sleeve 88 is turned by the spring 78 when the latter exerts a torque on the sleeve.

Rotational movement of the sleeve 88 causes rod 90 and member 48 to rotate with it, as one. Normally, spring 78 is wound so that it exerts a torque on the threaded shank 50 in the direction to cause it to back out of threaded bore 46 of piston rod 42. The torque exerted by spring 78 is sufficient to overcome the frictional resistance of the threaded shank 50 in bore 46, as long as there is clearance between the end of the head 52 and the bottom 38 of piston 36. As head 52 contacts the piston bottom 38, the additional resistance due to contact at this point, plus the additional force required to overcome the friction of the piston 36 in cylinder bore 30, and the additional force required to compress spring 74, all combine to overcome the torsional force exerted by spring 78, and rotation of member 48 therefore stops. At this point, all excess clearance has been taken up by the takeup mechanism and the only clearances in the system are the minimal running clearances, amounting to 0.010 to 0.040 inch, between the friction pads 18, 20 and their respective frictional surfaces 14 and 16.

During normal operation of the machinery with which the disc brake 10 is associated, the brake is maintained in the brakes-released condition by fluid pressure which is admitted to the cylinder chamber 64 and acts against piston 40, pushing the piston to the right against the end surfaces 70 of limit stop 68, and compressing springs 54. To actuate the brakes, the fluid pressure in cylinder chamber 64 is relieved, either by actuating a suitable valve in the hydraulic line, or in the case of a power failure, by stopping of the electric motor driving the hydraulic pump. With the release of pressure acting against piston 40, the latter is pushed to the left by springs 54, causing head 52 to push piston 36 against friction pad 20, thereby setting the brakes. During the 0.010 to 0.040 inch travel of the piston 36, required to take up the clearances between the friction pads 18, 20 and their frictional surfaces 14, 16, the friction ring 76 is carried along with the piston 36, and pushes against the retracting spring 74, flattening the latter against its retainer ring 82. If any further travel of piston 36 is required to set the brakes, the piston slides through the ring 76 until it has gone as far as it can go.

The brake is released by again introducing fluid pressure into the cylinder chamber 64, where it presses against piston 40, moving the latter to the right. During this movement of piston 40 to the right, piston 36 is caused to follow piston 40 by retracting spring 74, which pushes to the right against ring 76, until the latter abuts against the bottom of the counterbore 80. This movement of the piston 36 by the retracting spring 74 is only about 0.010 to 0.040 inch, which is enough to clear the friction pads 18, 20 from their respective friction surfaces. However, piston 40 is moved to the right by fluid pressure until it abuts against the end 70 of member 68. If piston 40 should travel a slightly greater distance than piston 36, the head 52 of member 48 would move away from the bottom 38 and open up a clearance at this point. Such clearance would then be taken up automatically by torsion spring 78, which turns rod 90 and its threaded member 48, until the latter has been advanced toward the piston bottom 38 and makes contact therewith.

When the friction pads 18, 20 become worn and it is necessary to replace them, piston 36 may be retracted into cylinder bore 30 to provide the necessary working clearance for removing the friction pads and their backup plates from the brake assembly. This is done by inserting a screwdriver through a hole 92 in the end of member 68, and engaging a screwdriver slot in the end of rod 90. Member 48 is turned in the appropriate direction by the screwdriver to cause the head 52 to be backed away from the bottom 38 of piston 36. This allows the piston 36 to be pushed back into its cylinder bore 30, so that the friction pads can be removed. Turning rod 90 by the screwdriver in the direction to retract piston 36 causes torsion spring 78 to be wound up tighter. When the piston 36 has been pushed fully into its cylinder 30, rod 90 may be released by the screwdriver and will not unwind, as the contact of piston bottom 38 against head 52 provides sufficient resistance to prevent spring 78 from pushing piston 36 to the left.

After the new friction pads have been installed and replaced in the brake assembly, the brakes are actuated and released several times, which causes the brake mechanism to take up all the clearances in the system until only the 0.010 to 0.040 inch running clearance between friction pads 18, 20 and their respective frictional surfaces 14, 16 remain. The brake is then ready for normal service.

Another slightly modified form of the clearance take-up device is shown in FIGS. 4 and 5 which are essentially the same as their counterparts in FIGS. 1–3 are given the same reference numerals, with the prime (') suffix. Thus, piston 40' has a piston rod 42' which is provided with an internally threaded bore 46' into which the threaded shank 50' of member 48' is screwed. The chief difference between the device of FIG. 4 and the corresponding one previously described is that the hexagonal rod 90' is not attached to the stem 50', but is entirely separate therefrom and slides within a hexagonal bore 94 extending the entire length of the member 48' on the axis thereof. Rod 90' slides freely within bore 94 but is not rotatable with respect to the stem 50'. Thus, any rotational movement of rod 90' causes the member 48' to turn with it.

Mounted in the outer, or right-hand end, of piston 40', as seen in FIG. 4, is the spring housing 84', which contains torsion spring 78'. One end of torsion spring 78' is attached to the outer wall of housing 84', and the other end is attached to a short tubular sleeve 88', having a hexagonal bore extending longitudinally along its axis, through which rod 90' extends. Rod 90' may be slidable through tubular sleeve 88', or it may be fixedly attached thereto. In either event, the torque of spring 78' is applied to the tubular sleeve 88', and is transmitted to rod 90', which, in turn, transmits the torque to member 48'. Thus, the torsion spring 78' exerts a torque on member 48' tending to advance the head 52' toward the bottom 38' of the piston 36', as in the preceding embodiment. The operation of the device shown in FIGS. 4 and 5 is otherwise identical to that shown in FIGS. 1–3.

While I have shown and described in considerable detail what I believe to be the preferred form of my invention, it will be understood by those skilled in the art that the invention is not limited to such details, but may take widely different forms within the scope of the following claims.

What I claim is:

1. A spring-actuated, hydraulically-released, fail-safe disc brake comprising, in combination:
   a rotatable disc having friction faces on opposite sides thereof;
   a pair of friction pads disposed with one pad adjacent each of said friction faces;
   a caliper housing operably connected to each of said friction pads for urging the same into braking engagement with their respective friction faces when the brake is actuated, said caliper housing having a pair of axially aligned cylinder bores provided therein;

a cylindrical aperture connecting said cylinder bores along the axis thereof;

a first piston slidably disposed within one of said cylinder bores and having an end portion bearing against the adjacent friction pad;

a second piston slidably disposed within the other cylinder bore, said second piston having extension means thereon passing through said aperture into said one cylinder bore;

a clearance-takeup member having a threaded connection with said extension means on said second piston; said member having an end portion abutting against said first piston so that when said second piston is urged in the direction to apply the brakes, said clearance-takeup member pushes said first piston in the same direction, causing said friction pads to be pressed against said friction surface;

compression spring means bearing against one side of said second piston in one direction to apply the brakes;

means for introducing fluid pressure into said other cylinder bore on the side of said second piston opposite said compression spring means, said fluid pressure being operable to move said second piston in the other direction against the resistance of said compression spring means, thereby releasing the pressure of said spring means against said second piston so as to release the brakes;

means frictionally engaging said first piston for retracting the same a predetermined small distance from its respective friction pad when fluid pressure acts against said second piston, so as to open up a minimum running clearance between the friction pads and said friction faces on said disc; and torsional spring means connected between said second piston and said clearance-takeup member so as to exert torque in one direction against said second piston and in the other direction against said clearance-takeup member to turn the latter in the direction to cause it to be extended with respect to the second piston whenever there is any clearance between said end portion of the clearance-takeup member and said first piston when the brake is released.

2. The invention as defined in claim 1, wherein said torsional spring means acts against a member that is slidably but non-rotatably connected to said clearance-takeup member.

* * * * *